United States Patent [19]
Christensen et al.

[11] Patent Number: 6,166,829
[45] Date of Patent: *Dec. 26, 2000

[54] IMAGE SCANNER WITH INTRINSIC BIASING OF A SCAN HEAD

[75] Inventors: Michael L. Christensen, Windsor; Stephen J. Cook, Loveland, both of Colo.

[73] Assignee: Hewlett-Packard Company, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 09/067,785

[22] Filed: Apr. 28, 1998

[51] Int. Cl.$^7$ ...................................................... H04N 1/024
[52] U.S. Cl. ............................................ 358/473; 358/414
[58] Field of Search ..................................... 358/473, 474, 358/408, 414, 472, 486, 487, 494, 496, 497; 382/312

[56] References Cited

U.S. PATENT DOCUMENTS

| | | |
|---|---|---|
| 4,256,399 | 3/1981 | Ikeda ............................................. 355/8 |
| 4,371,254 | 2/1983 | Beery ............................................ 355/8 |
| 4,553,174 | 11/1985 | Moriguchi et al. ...................... 358/285 |
| 5,373,372 | 12/1994 | Loewen .................................... 358/486 |
| 5,857,133 | 1/1999 | Sun .......................................... 399/211 |
| 5,907,413 | 5/1999 | Han ......................................... 358/497 |

FOREIGN PATENT DOCUMENTS

| | | | |
|---|---|---|---|
| 0448275A | 9/1991 | European Pat. Off. ........ G03B 27/52 |
| 298 05 117 U | 5/1998 | Germany .......................... H04N 1/10 |
| 2336052A | 10/1999 | United Kingdom ............. H04N 1/10 |

*Primary Examiner*—Jerome Grant, II
*Attorney, Agent, or Firm*—Augustus W. Winfield

[57] ABSTRACT

An optical image scanner includes a scan head that is mounted onto a guide member with a bias torque that reduces uncertainty in position of the scan head. A drive member, such as a belt or cable, is attached to the scan head with an offset relative to a centerline of the guide member. A tensioning device ensures that the drive member asserts force on the scan head at each of the attachment points. As a result, a bias torque is placed onto the scan head, relative to the guide member, reducing uncertainty in position. For bidirectional movement, the biasing torque is the same for either direction of travel.

2 Claims, 2 Drawing Sheets

IMAGE SCANNER WITH INTRINSIC BIASING OF A SCAN HEAD

FIELD OF INVENTION

This invention relates generally to electronic image scanners and more specifically to a mechanism for moving a scan head relative to a document.

BACKGROUND OF THE INVENTION

Image scanners, copiers, facsimile machines and other electronic imaging devices provide images in an electronic form suitable for transmission, printing or storage. In a typical image scanner or copier, light from a document or other image source is focused onto linear arrays of photosensors for scanning one line at a time. A two dimensional image is scanned by providing relative movement between the linear sensor arrays and the original image. In some scanning mechanisms, a line from a document is focused onto a sensor array having an overall length that is much shorter than the length of the line being scanned. For scanners with small sensor arrays, the light path is folded by mirrors to accommodate the focal length of an optics system. In other scanning mechanisms, the sensor array length is substantially the same as the line being scanned. For either type of sensor array, there is a need for a system for moving the sensor array relative to the document or other image while maintaining a precise alignment of the sensor array relative to the document or other image being scanned.

SUMMARY OF THE INVENTION

A scan head containing a sensor array is mounted with bearing surfaces on a guide member (or members) and moved by a belt or cable system. The bearing surfaces have some clearance for motion, resulting in some uncertainty in scan head position. The belt or cable system is attached with an offset that provides a biasing torque. The biasing torque is consistent, eliminating uncertainty in clearance. For bidirectional movement, the biasing torque is the same for either direction of travel. The result provides scan head motion with improved accuracy with no additional cost.

DETAILED DESCRIPTION OF THE PREFERRED EMBODIMENT OF THE INVENTION

Figure 1:
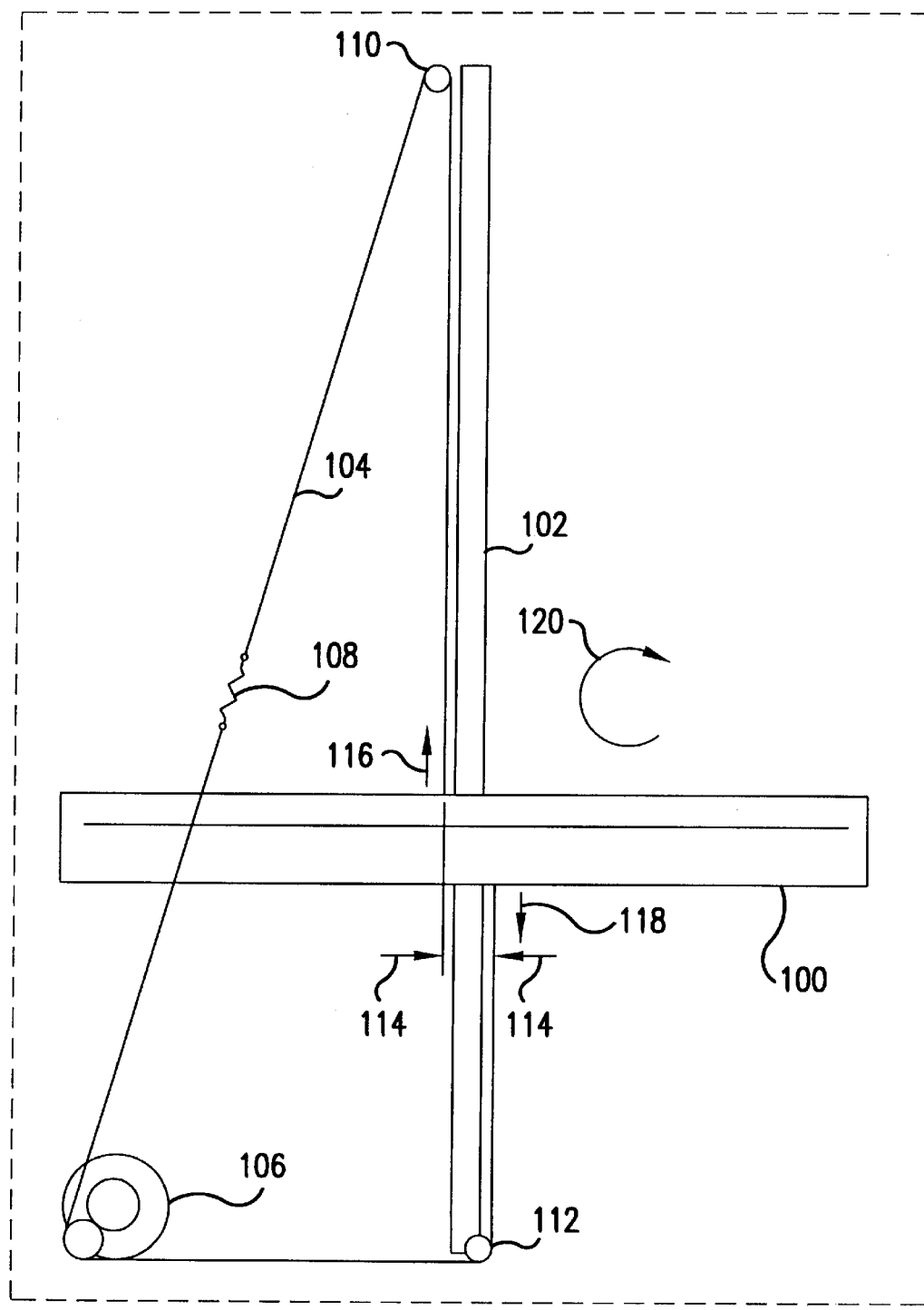
FIG. 1 is a plan view of an optical image scanner with an offset mounted drive member in accordance with the invention.

FIG. 1 illustrates an example embodiment of a scan head mounted in accordance with the invention. A scan head 100, also known as a carriage, is mounted onto a single guide member 102. The scan head rides on bearing surfaces (not illustrated in FIG. 1). Because of the required motion, there must be some side-to-side clearance between the guide member and the bearing surfaces. This clearance can result in uncertainty in the scan head position transverse to the guide member and uncertainty in skew. In general, clearance can be reduced by relatively expensive bearings. Alternatively, where low cost is an objective, uncertainty of position may be reduced by forcing the scan head against the guide member in a known direction. The present invention provides such a force, for bidirectional movement, at no additional cost.

The scan head 100 is driven by a drive member 104, which may be, for example, a cable, a belt, or similar flexible member. Drive member 104 is in turn driven by a motor 106. Between the motor and the drive member there may be gears, pulleys, or other motion transmission devices that are not relevant to the invention. Drive member 104 is held taut by a tensioning device. In the example embodiment, the tensioning device is illustrated as an in-line spring 108, but other tensioning methods, such as an elastic belt, weights, and spring loaded idler pulleys are equally suitable. In the example embodiment, the drive member 104 wraps around pulleys 110 and 112. The two ends of the drive member 104 are attached to the scan head 100 on opposite sides of the guide member 102, resulting in an offset of the two ends of the drive member as indicated by arrows 114. One end of the drive member provides a force in the direction indicated by arrow 116. The other end of the drive member provides a force in the direction indicated by arrow 118. The two forces are offset either side of a centerline of the guide member. As a result, a biasing torque, in the direction indicated by arrow 120, is placed on the scan head 100.

Regardless of the direction of movement of the scan head, the biasing torque is maintained by the tension resulting from tensioning device 108. Assume the direction indicated by arrow 118 is defined as a forward direction. If the motor 106 is pulling on the scan head in the forward direction (arrow 118), the tensioning device ensures a reverse tension on the opposite end of the drive member as indicated by arrow 116. If the motor is pulling on the scan head in the reverse direction (arrow 116), the tensioning device ensures a forward tension on the opposite end of the drive member as indicated by arrow 118. Therefore, a biasing torque, with an overall direction indicated by arrow 120, is maintained on the scan head for bidirectional travel. The biasing torque is provided by offsetting the attachment points for the drive member, with no additional cost.

Figure 2:
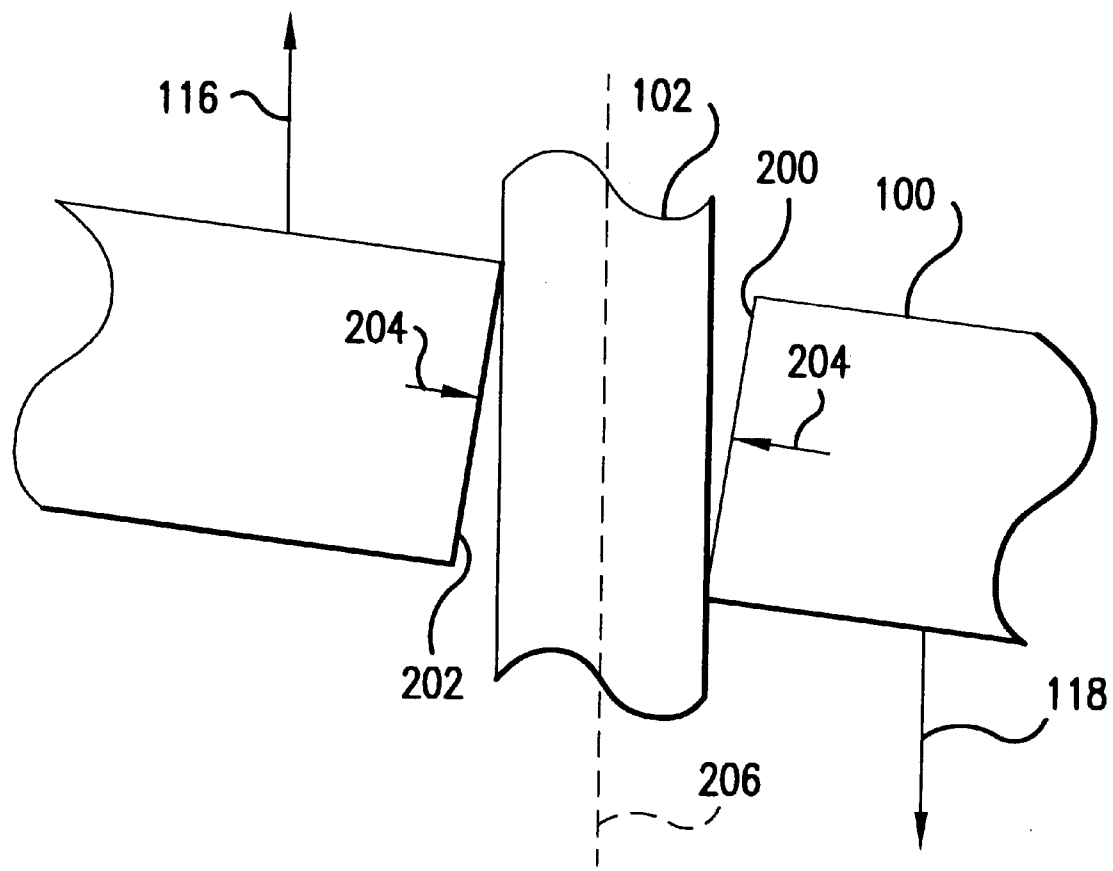
FIG. 2 is an expanded view of part of FIG. 1 illustrating the result of a bias torque.

FIG. 2 illustrates the result of the biasing torque. In FIG. 2, scan head 100 is illustrated as having bearing surfaces 200 and 202. Surfaces 202 have a spacing, indicated by arrows 204, that is greater than the width of the guide member. The biasing torque forces the bearing surfaces in the scan head against the guide member in a consistent orientation, reducing position uncertainty for the scan head. In order to provide a consistent orientation for bidirectional movement, both attachment locations for the drive member must be offset from the centerline 206 of the guide member and the attachment locations must be on opposite sides of the centerline 206.

The guide member shape is not important. The guide member cross-section may be circular or rectangular or any other shape appropriate for a bearing surface. There may be more than one guide member. There may be additional guide surfaces to prevent rotation around the guide member. The bearing surfaces may be rollers, sleeves, or, as illustrated in FIG. 2, sliding surfaces integrally formed onto the scan head. The drive member in the example embodiment is illustrated as having ends attached to the scan head, but the drive member may be continuous at the scan head, wrapping around posts or other details to provide the required offset. It is not necessary for the drive member attachment points to be symmetrical about the centerline. Note that too much torque may result in unacceptable friction. In the design illustrated in FIGS. 1 and 2, torque is a function of the tension (tensioning device 108) and the offset (the distance between the attachment points transverse to the direction of travel, FIG. 1, arrows 114).

The foregoing description of the present invention has been presented for purposes of illustration and description.

It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An image scanner comprising:

a guide member having a centerline;

a scan head, moveably mounted onto the guide member;

a drive member, attached to the scan head at a first location and at a second location, the first location offset from the centerline of the guide member in a first direction transverse to the centerline of the guide member and the second location offset from the centerline of the guide member in a second direction opposite the first direction; and a tensioning device providing a tension on the drive member, wherein when the drive member is exerting a force on the scan head, parallel to the centerline of the guide member, at the first location, the tension device maintains a force on the guide member at the second location, in the opposite direction, thereby maintaining a torque on the scan head relative to the guide member.

2. A method of positioning a scan head in a scanner, the method comprising the following steps:

mounting the scan head onto a guide member;

providing a force at a first location on the scan head, the first location being offset from a centerline of the guide member;

providing a force at a second location on the scan head, the second location offset from the centerline of the guide member in an opposite direction from the first location, thereby maintaining a torque on the scan head relative to the guide member.

* * * * *